United States Patent
Schwarz et al.

[15] 3,659,996
[45] May 2, 1972

[54] DEVICE FOR THE INJECTION MOLDING OF EXPANDABLE PLASTIC MASSES

[72] Inventors: Ernst Schwarz, Pottschach; Peter Scherz, Kottlach, both of Austria

[73] Assignee: SEMPERIT Osterreichisch-Amerikanische Gummiwerke Aktiengesellschaft, Wien, Austria

[22] Filed: Feb. 19, 1970
[21] Appl. No.: 12,669

[30] Foreign Application Priority Data

Feb. 20, 1969 Austria ..................A 1739/69

[52] U.S. Cl.................................425/245, 425/4, 425/119, 425/129, 425/817
[51] Int. Cl. .....................................B29f 1/03
[58] Field of Search................18/30 AC, 30 B, 30 D, 30 NS, 18/30 RV

[56] References Cited

UNITED STATES PATENTS 2,754,545  7/1956  Hendry................................18/30 AC
2,871,515  2/1959  Loew....................................18/30 B
3,339,239  9/1967  Peck....................................18/30 RV
3,344,477  10/1967 Stokis..................................18/30 B X
3,374,502  3/1968  Lazzara................................18/30 B

FOREIGN PATENTS OR APPLICATIONS 1,193,335  11/1959  France...............................18/30 AC
  653,159   2/1963  Italy..................................18/30 AC Primary Examiner—R. Spencer Annear
Attorney—Ernest F. Marmorek

[57] ABSTRACT

A device for the injection molding of expandable plastic masses, such as foamable synthetic substances through an injection conduit having a valve seat into an injection mold. A valve body is exchangeably inserted into the injection conduit after which the mold is filled therethrough, the plastic mass then flows past the valve body where, upon the termination of the molding process, the valve body is pressed into a closed position against the valve seat by the internal pressure of the mold thereby effectively sealing said conduit against outflow of any of said injection material.

6 Claims, 10 Drawing Figures

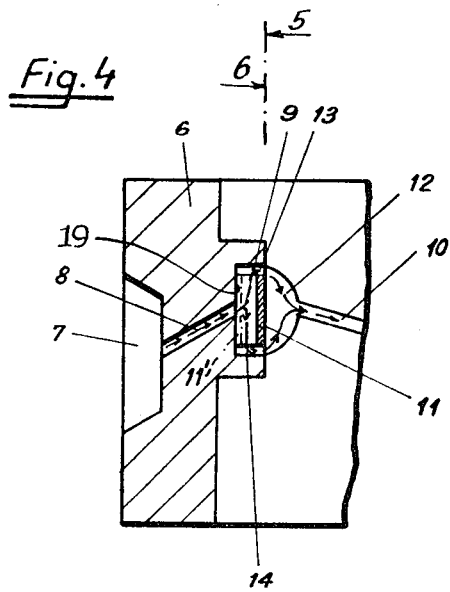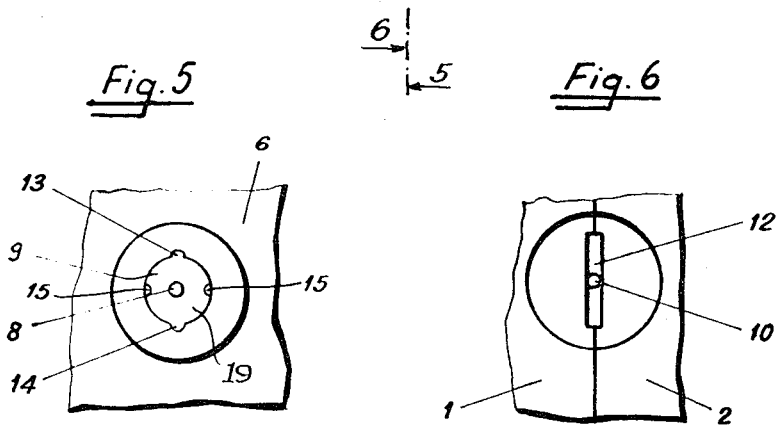

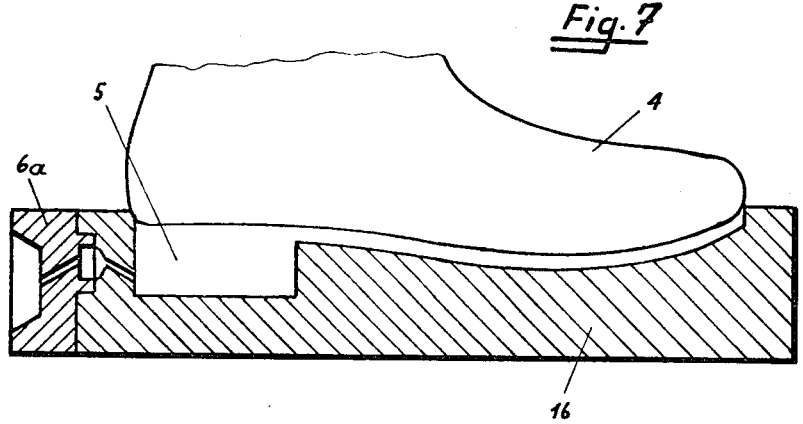
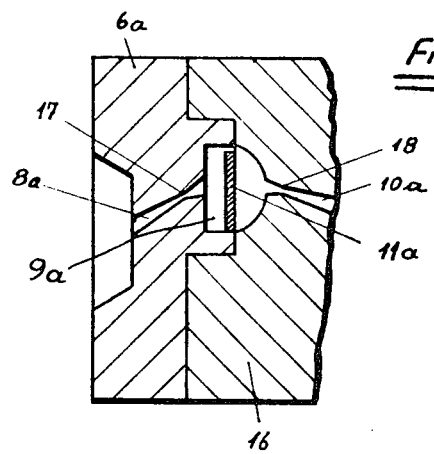
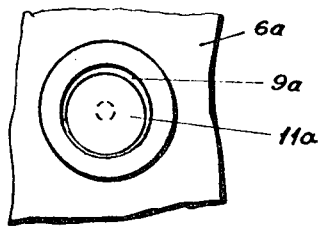
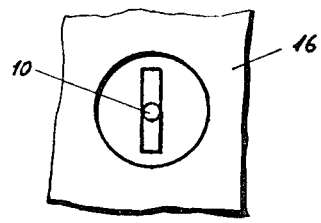

3,659,996

DEVICE FOR THE INJECTION MOLDING OF EXPANDABLE PLASTIC MASSES

BACKGROUND OF THE INVENTION

The invention relates to injection molding of plastic masses, such as foamable synthetic materials, through an injection conduit having a valve seat and removable insertable valve body into an injection mold, and particularly to a device for carrying out the process.

For the purpose of filling an injection mold, the latter displays an injection conduit, which outwardly opens into a mouthpiece. After the injection mold is filled with the foamable synthetic material, the latter would partially flow out through the injection conduit, especially during the foaming process. It therefore becomes necessary to close this injection conduit after the filling process.

It has been shown that mechanical closing devices, such as, for example, slides, valves, check valves, or the like, are unsuitable since the synthetic substance has the tendency of penetrating into the sealing arrangement thereof. This will occur even if the sealing should display only a slight tolerance, as movable parts are thereby obstructed. These check valves, or the like, would thus need to be cleaned at short time intervals.

It had been attempted to construct closing devices, in which the synthetic material had no opportunity of penetrating into the packings. Thus, to give an example, it had been proposed to develop one portion of the injection conduit in the form of an elastic tubing, which was constricted through an external pressure medium, such as, for example, a piston, hydraulic fluid, or the like. However, this device had the disadvantage that the elastic tubing did not form a tight seal and due to the great wear and tear, had to be frequently exchanged. These replacement procedures required a great deal of time and resulted in a poor utilization of the mold.

SUMMARY

It is accordingly among the principal objects of the invention to obviate the aforesaid drawbacks of the prior art.

It is another object of the invention to provide an inexpensive and non-wasteful, reliable process of and machine for injection molding.

Generally, these objects are accomplished by providing for the injection molding of plastic masses characterized in that a valve body is inserted into the injection conduit after which the injection mold is filled through the injection conduit so that the plastic mass or the synthetic substance flows past the valve body. After termination of the injection molding process the valve body is pressed into a closed position by the internal pressure of the mold. Subsequent to molding the valve body is removed from the mold and either cleaned or exchanged.

Through this it is now possible to securely close the injection conduit after each injection process. No process of contamination can take place which would render the closing device in the injection conduit ineffective, since the closing device is newly inserted for each injection process. The mold is constructed in such a manner that the valve body can be easily and quickly inserted.

The valve body, to give an example, can be a small disk made of synthetic material, cardboard, paper, or the like. This disk is quite inexpensive and even if used only once each time, the overall mold costs are not essentially increased thereby.

Other objects of the invention will in part be obvious and will in part appear hereinafter.

With the above and other objects of the invention in view, the invention consists in the novel, construction, arrangement and combination of various devices, elements and parts, as set forth in the claims hereof, one embodiment of the same being illustrated in the accompanying drawings and described in the specification.

In the accompanying drawings,

FIG. 4 is a large scale fragmentary sectional view showing a part of FIG. 1;

FIG. 5 is a fragmentary side elevational view seen in direction 5—5 of FIG. 4;

FIG. 6 is a fragmentary side elevational view seen in the direction 6—6 of FIG. 4;

FIG. 7 is a horizontal sectional view similar to FIG. 1 but embodying a modification;

FIG. 8 is a large scale fragmentary sectional view similar to FIG. 4 but embodying the modification of FIG. 7;

FIG. 9 is a fragmentary side elevational view similar to FIG. 5 but embodying the modification of FIG. 8;

FIG. 10 is a fragmentary side elevational view similar to FIG. 6 but embodying the modification of FIG. 8.

Figure 1:
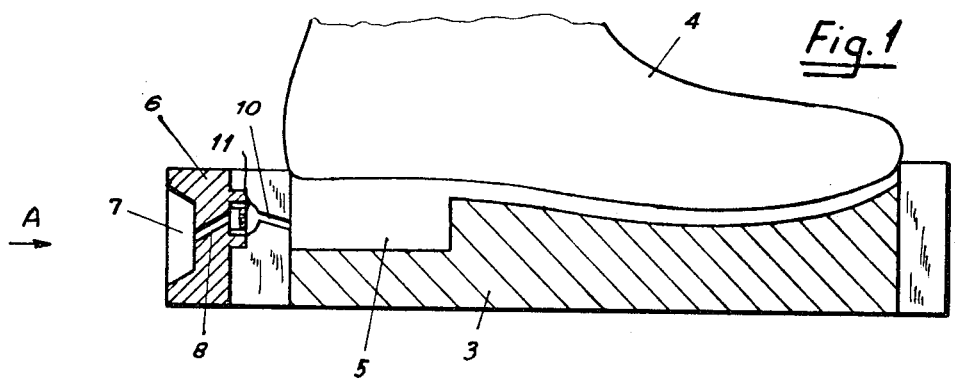
FIG. 1 is a horizontal sectional view of a mold in accordance with an embodiment of the invention taken on the line 1—1 of FIG. 2.
Figure 2:
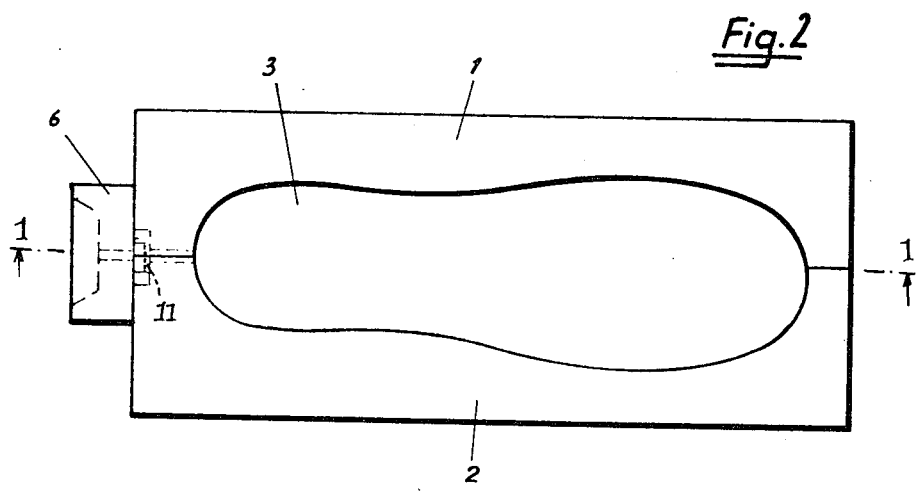
FIG. 2 is a top plan view of the embodiment shown in FIG. 1.
Figure 3:
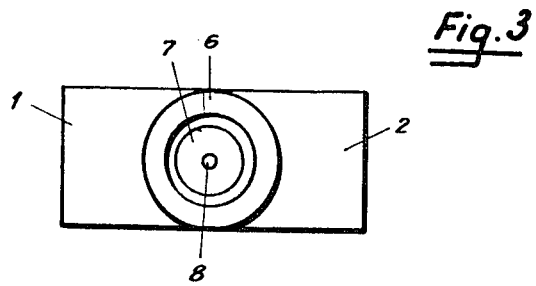
FIG. 3 is an end elevational view seen in the direction A of FIG. 1.

In carrying the invention into effect in the embodiments which have been selected for illustration in the accompanying drawings and for description in this specification, and referring now particularly to FIGS. 1–6, the mold includes two lateral mold-halves 1 and 2, between which a recessed area 3 is arranged, for instance in the form of a shoe sole is arranged. A last with an upper 4 is set upon the upwardly opening mold. A cavity 5 is formed thereby, which corresponds to the sole and heel portions.

To facilitate the molding operation, an external source containing the material to be injected is connected to a conical indentation 7 which is part of a mouthpiece 6 which parts are located on the mold halves 1 and 2. A spray head or injection head can be connected thereto for instance temporarily at which point the injection molding process is ready to begin. The cavity 5 is then subjected to the injected expandable material, namely a foam plastic mass or synthetic substance, such as a foamable synthetic material.

An external injection conduit 8 leads away from said indentation 7 and communicate via and internal injection conduit 10 in the mold halves 1 and 2 the cavity 5. About midway between the mouthpiece 6 and the mold-halves 1 and 2, a first recess or valve chamber 9 is provided which defines a valve seat 19 for a back pressure or nonreturn valve body 11 which is freely movable within the valve chamber 9.

In order to assure that the valve body in the form of a disk 11 is limited in its movement in the direction of the flow during the injection process, the mouth of the internal injection conduit 10 at the front surface of the mold halves is extended into a slot-shaped passageway that forms an abutment or a limited stop for the valve body or disk 11 in an open valve position thereof.

The first recess or valve chamber 9, has a diameter which essentially corresponds to that of the valve body 11, but has two milled grooves 13 and 14, which line up with the two ends of the slot 12 (FIG. 4). The length of the slot 12 is such as to exceed the diameter of the valve disk 11 thereby allowing the flow of the expandable foam material into the conduit 10 and therethrough into the cavity 5.

During the injection process, the valve body 11 is pressed by the force of the injection pressure against the front surface of the mold halves and closes a center part of the slot 12, the latter leading into the injection conduit 10. The synthetic substance thereby will flow through the milled grooves 13 and 14 and the end portions of the slot shaped passageway 12 into the internal injection conduit 10 and finally will reach the cavity 5. After the injection process is terminated, the flow of the injected material ceases and the source of material is disconnected from the conical indentation 7, whereupon the valve body 11 is pressed by the internal pressure of the foamed material in the mold, against the external injection conduit 8 whereby it tightly closes the latter by coming to lie against the wall of the valve seat 19.

In order to make it possible for air to escape from the cavity 5, the valve body 11 can be provided with small holes, should it be necessary.

After the foaming process is terminated, the mold-halves 1 and 2 are separated, for instance by the operator, and the molded object, such as the shoe with the heel and sole molded thereon, removed from the mold. Since the injection conduits 8 and 10 as well as the valve chamber 9 and the slot-shaped passageway 12 are divided in a plane corresponding to the section plane between the mold halves 1 and 2, the valve body 11 can easily be removed from the disassembled mold together with any excess material located in the injection conduits 8 and 10 and in the first recess or valve chamber 9. Prior to the assemblage of the mold, a new disk 11 is inserted into the first recess or valve chamber 9.

In order to assure that a new disk 11 can be inserted in an easy manner and to prevent the disk 11 from dropping downward during the process in which the mold-halves 1 and 2 are pushed together, it is expedient to provide a mounting support 15 in the cavity by means of which the disk 11 is retained in one mold-half.

FIGS. 7, 8, 9, and 10 show a construction for a one-part mold. Laterally, this mold 16 displays a mouthpiece 6a.

It has been found that, especially in the case of synthetic substances with low viscosities, a milled groove such as the milled grooves 13 and 14 in FIG. 4 do not always have to be present in the first recess 9a if said recess has a diameter which is somewhat larger than the diameter of the disk 11a. Such a construction form is illustrated in FIGS. 8, 9, and 10.

The external injection conduit 8a has a construction 17, and the internal injection conduit 10a a constriction 18. After termination of the foaming process, the mouthpiece 6a is removed from the mold 16 whereby the material, which, in a given case, is present in the external injection conduit 18 easily breaks at the constriction 17. During the removal of the shoe, the excess material which is present in the internal injection conduit 9, tears off at the constriction 18. The residual material which is present in the first recess 9a can easily be removed when the disk 11a is removed.

The method and devices which are based on the present invention were explained by means of a sole mold for shoes. However, they are not limited to this special case, but can be used in the case of many other molds in which plastic masses, especially foamable synthetic substances, are processed.

An embodiment of the invention may provide the disks with small air escape holes for excess pressure release. Additionally, the recess may be provided with a mounting support for said valve body and in an embodiment for longitudinally divided injection conduits the mounting support may be arranged eccentrically in the injection conduit.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. An injection molding device for expandable plastic masses, such as foamable synthetic substances, for use in connection with a mold,
   comprising in combination,
   means establishing at least one detachable injection conduit operative to receive the flow of said plastic material during mold filling, and defining a valve seat,
   a limit stop passageway leading towards said mold and communicating with said detachable conduit,
   an expendable valve disk exchangeably positioned within said conduit for free movement between said valve seat and said limit stop passageway and being movable between an open position spaced apart from said valve seat into which position it is pushed by the material flowing in said conduit in the direction towards the mold during mold filling, and in which position the injected plastic material will flow around said valve disk through said limit stop passageway on its way to the mold and, respectively, a closed position wherein said valve disk abuts against said valve seat for sealing said conduit, said valve disk being pushed against said valve seat by the internal pressure of said expandable material within said mold upon the cessation of the flow of material towards the mold.

2. In an injection molding device, as claimed in claim 1, wherein said injection conduit forms a valve chamber which is provided with a sealing surface defining said valve seat, said valve disk being movable and exchangeably positioned in said valve chamber, the wall of said valve chamber defining with the valve body a bypass for the flow of material past the valve disk on its way into said mold.

3. In an injection molding device, as claimed in claim 2, wherein said valve disk defines an area which is smaller than the cross-sectional area of said recess thereby forming said bypass for the open valve position, said valve seat being smaller than the area of the valve body whereby said valve body in the closed position will cover said valve seat and thereby will prevent any return flow around the valve body.

4. An injection molding device, as claimed in claim 1, wherein said recess is provided with a mounting support for said valve body.

5. An injection molding device, as claimed in claim 4 for longitudinally divided injection conduits, wherein said mounting support is arranged eccentrically in said injection conduit.

6. An injection molding device according to claim 1, wherein said mold is divided in a plane passing through the long axis of said limit stop passageway.

* * * * *